United States Patent
Falkena

(10) Patent No.: US 8,949,398 B2
(45) Date of Patent: Feb. 3, 2015

(54) SHARED DNS DOMAIN HANDLING

(75) Inventor: Jonas Falkena, Huddinge (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 778 days.

(21) Appl. No.: 12/738,458

(22) PCT Filed: Oct. 18, 2007

(86) PCT No.: PCT/SE2007/000919
§ 371 (c)(1),
(2), (4) Date: Apr. 16, 2010

(87) PCT Pub. No.: WO2009/051529
PCT Pub. Date: Apr. 23, 2009

(65) Prior Publication Data
US 2010/0217856 A1      Aug. 26, 2010

(51) Int. Cl.
*G06F 15/173* (2006.01)
*H04L 29/12* (2006.01)
*H04L 29/06* (2006.01)

(52) U.S. Cl.
CPC ...... *H04L 29/12594* (2013.01); *H04L 61/3085* (2013.01); *H04L 65/1016* (2013.01); *H04L 65/1069* (2013.01); *H04L 29/12066* (2013.01); *H04L 61/1511* (2013.01)
USPC ...................................................... 709/223

(58) Field of Classification Search
CPC ............ H04L 29/12594; H04L 61/3085; H04L 29/12066; H04L 61/1511
USPC ...................................................... 709/223
See application file for complete search history.

(56) References Cited

U.S. PATENT DOCUMENTS

| | | | |
|---|---|---|---|
| 7,224,800 B1 * | 5/2007 | Flykt et al. | 380/247 |
| 2004/0006597 A1 * | 1/2004 | Hughes | 709/206 |
| 2005/0204064 A1 | 9/2005 | Ruiz | |
| 2007/0071221 A1 * | 3/2007 | Allen et al. | 379/265.01 |
| 2007/0136413 A1 * | 6/2007 | Ishikawa et al. | 709/200 |
| 2007/0150732 A1 | 6/2007 | Suzuki et al. | |
| 2009/0063406 A1 * | 3/2009 | Golander et al. | 707/3 |
| 2009/0068996 A1 * | 3/2009 | Bakker et al. | 455/414.1 |

FOREIGN PATENT DOCUMENTS

| | | |
|---|---|---|
| JP | H11-284667 A | 10/1999 |
| JP | 2005-092600 A | 4/2005 |

OTHER PUBLICATIONS

PacketCable 2.0, SIP Signaling Technical Report, Oct. 13, 2006, Cable Television Laboratories, pp. 1-44.*
3rd Generation Partnership Project, 3GPP TS 24.229 V7.7.0, Mar. 2007, 3GPP Orginizational Partners, Version 7, pp. 1-409.*

* cited by examiner

*Primary Examiner* — Esther Benoit

(57) ABSTRACT

Instead of rejecting an incoming request at a node of a SIP domain, e.g. an IMS domain, when a user database query has failed, it is determined whether the DNS domain name of the request is registered as a shared domain or not. If it is found that the DNS domain name is registered as a shared domain, the DNS domain name is resolved into a globally routable URI, and the request is routed towards the terminating entity. If, however, the DNS domain name is not shared, the request is rejected. Such a mechanism enables operators to allow for a DNS domain name to be utilized by more than one SIP domain.

20 Claims, 4 Drawing Sheets

| Domain | Shared | Shared with |
|---|---|---|
| domain1.com | yes | telenor.com |
| domain2.com | no | |
| domain3.com | yes | - |

SHARED DNS DOMAIN HANDLING

TECHNICAL FIELD

The present invention relates generally to a method and arrangement for handling a shared DNS domain, and more particular for enabling for a DNS domain name to be shared by two or more SIP domains.

BACKGROUND

IMS (IP Multimedia Subsystem) is a set of standards providing the signalling, delivery, authentication and billing functions necessary for real-time, packet-based calls and services across virtually any underlying network technology. In other words, IMS is a platform adapted for an efficient and rapid implementation of next-generation IP services in both fixed and mobile networks which will accelerate the convergence of fixed and wireless networks.

The Session Initiation Protocol (SIP) is a transport independent, text based-application-layer control protocol for creating, modifying and terminating sessions involving one or more participants, including internet calls, multimedia distributions and multimedia conferences. SIP is widely used as a signalling protocol for voice over IP, and has been accepted as a $3^{rd}$ Generation Partnership Project (3GPP) signalling protocol for the IMS.

In the 3GPP IMS Domain Name System (DNS), domains are used to identify to what SIP domain a user belongs. In previously known applications, one DNS domain can only be represented by one SIP domain, which may be e.g. an IMS domain. Such a restriction may become a problem, for example for a multinational enterprise having outsourced their communication solution by investing e.g. in an IMS based IP-centrex/telephony Virtual Private Network (VPN) technology. Typically for this type of scenario, the users are spread over the world, wherein users of different geographical regions normally are managed by different operators, each managing different IMS domains.

A simplified method for handling an incoming request for an IMS related service at an IMS domain "domain1.com" 100, managed by operator A, according to the prior art will now be described with reference to FIG. 1. It is to be understood that, although management of an IMS domain normally involves more nodes and signalling than what is shown in FIG. 1, nodes and signalling steps which are not necessary for the understanding of the general procedure for handling an incoming request have been omitted, for simplicity reasons.

In a first stage 1:1, a request addressed to "user1", having a URI, such as e.g. "user1@domain1.com" reaches an Interrogating Call Session Control Function (I-CSCF) 101 of operator A, i.e. the operator responsible for managing the IMS domain, "domain1.com". In order to be able to route the request to "user1", the DNS domain name of the request has to be properly resolved. This may be achieved by interrogating a user database of operator A, typically a Home Subscriber Server (HSS) 102, in a next stage 1:2. The HSS is the main data storage for all IMS-related subscriber- and service data of the IMS domain of operator A. The main data stored in the HSS includes a user profile for each user, registered to the IMS domain. The user profile comprises user information for routing an incoming request to an Serving CSCF (S-CSCF), and further to the terminating user entity. A user profile is a collection of user-specific information that is permanently stored in the HSS, including public user identities, which may be a SIP URI, e.g., bob.home@domain1.com, or a tel URIs, e.g., tel:+46 8 123 456 67.

If the interrogation of the HSS 102 results in a match, the request is routed to the relevant S-CSCF 103, of operator A, as indicated with a stage 1:3a. From S-CSCF 103 the request is forwarded towards the intended terminating entity, such as e.g. an Application Server (AS) (not shown), which may provide the requested service to the requesting party. If, however, no match is found at the HSS query, the request is rejected, resulting in a failure for operator A to provide the requested service to the requesting party. This alternative is indicated with an alternative final stage 1:3b.

A company like Ericsson, having a URI scheme with URIs like e.g. "user1@ericsson.com", may want to be able to use the "ericsson.com" domain internationally, rather than only regionally. No solution for providing such a feature is, however, known today.

SUMMARY

It is an object of the present invention to provide a method for allowing a DNS domain name to be utilized by more than one SIP domain, and equipment adapted for such a method. This may be achieved by making the operator of the SIP domain aware that a DNS domain name of an incoming request is a shared domain, and, thus, to provide, a mechanism for resolving the destination URI of such a request so that it can be routed accordingly, instead of rejecting it, as a result of a failed user database query, executed in the own domain.

According to one aspect, a method is provided where a node of-a SIP domain, such as e.g. an IMS domain, is adapted to handling an incoming request for which a user database query has failed (401), i.e. a query of the request has not resulted in a match. A typical node for implementing such a method is a Call Session Control Function (CSCF), such as e.g. an Interrogating CSCF (I-CSCF).

The described scenario would normally have resulted in the rejection of the request, since the node would have been unable to find the appropriate terminating address to route it to. However, instead of rejecting the request, a procedure is proposed which determines whether the DNS domain name of the request is registered as a shared domain or not. Such a procedure may be executed by checking configuration data, which may be previously stored at, or in access to, the node.

If it is determined that the DNS domain name is registered as a shared domain the DNS domain name is resolved into a globally routable URI, and the request is routed towards the terminating entity. If, however, it is found that the DNS domain is not registered as a shared domain, the request will be rejected, as per standard behaviours.

According to one embodiment, the configuration data comprises all DNS domains, managed by the operator of the SIP domain, and an associated parameter, indicating whether the respective DNS domain is a shared domain or not. Alternatively, the configuration data may also comprise a post for storing one or more URIs, each indicating one or more SIP domains, with which a respective shared DNS domain is shared.

According to one embodiment, configuration data comprising one or more SIP domains, i.e. a DNS domain name is shared between one or more SIP domains, which are registered in the configuration data, may be used when resolving the DNS domain name into a globally routable URI.

According to an alternative embodiment, which may be implemented alone or in combination with the previous embodiment, absence of a registered SIP domain in the respective post of the configuration data may result in a query, e.g. a DNS query, prior to resolving the DNS domain name.

According to another aspect, a node for implementation of the mechanism described above is also provided. A node according to one embodiment comprises a query unit for initiating a domain checking procedure in response to a failed user database query. A domain checking unit is adapted to execute the domain checking procedure, wherein it is determined if the DNS domain of the request is registered as a shared domain or not. The domain checking unit is adapted to resolve the DNS domain name into a globally routable URI, and to route the request towards the terminating entity if it is found that the DNS domain is registered as a shared domain, or to reject the request if the DNS domain is not registered as a shared domain. The domain checking procedure may comprise checking configuration data stored at, or in association with the node.

According to one alternative embodiment, the domain checking unit may be adapted to resolve the DNS domain name of a request into a globally routable URI on the basis of the configuration data if one or more SIP domains with which the respective DNS domain is shared are registered in the configuration data.

According to another alternative embodiment, which may be implemented alone or in combination with the previous embodiment, the domain checking unit is adapted to resolve the DNS domain name after having performed a query, if no SIP domain is registered in the configuration data.

BRIEF DESCRIPTION OF THE DRAWINGS

The present invention will now be described in more detail by means of exemplary embodiments and with reference to the accompanying drawings, in which.

DETAILED DESCRIPTION

Briefly described, the present invention provides a mechanism for allowing a DNS domain name to be utilized by more than one SIP domain, i.e. a mechanism is suggested which allows a DNS domain to be used as a shared DNS domain.

Figures 1, 3:
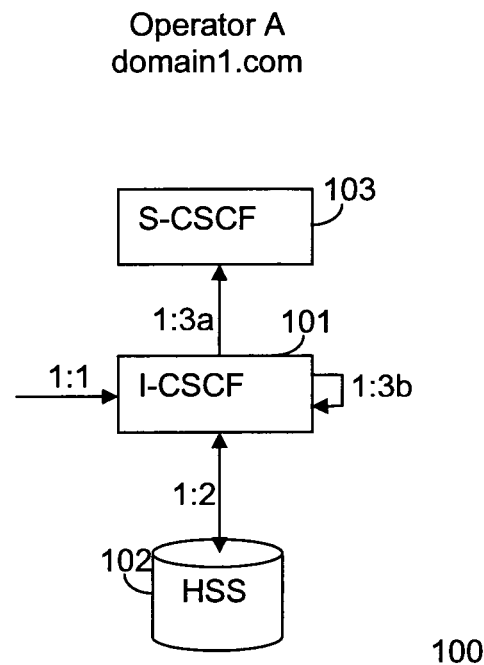
FIG. 1 is a basic overview of a procedure for handling a request in an IMS domain, according to the prior art.
FIG. 3 is a table illustrating an exemplified extended configuration, according to one embodiment.

According to one embodiment, a mechanism for handling a shared DNS domain may be achieved by introducing a modified node of a SIP domain, typically an I-CSCF, which, in resemblance to the prior art example described earlier with reference to FIG. 1, is responsible for interrogating a request, arriving at the SIP domain. The SIP domain may be an IMS domain, or any other type of network adapted to use the SIP protocol. A domain checking procedure is introduced at the node of the SIP domain. The procedure is to be executed in response to an unsuccessful user database query, typically a HSS query.

It is to be understood that, although this exemplified embodiment is based on a modified I-CSCF, interrogating a HSS, and routing requests to other CSCF nodes, the proposed mechanism will be applicable also for implementation on other entities, adapted to handle corresponding queuing and routing procedures.

According to the prior art, a user database query of a request failing to result in a match would have resulted in a rejection of the respective request, and, thus, with a failure for the operator to provide the requested service to the calling party. Instead of rejecting the request in such a situation, the proposed domain checking procedure is adapted to interrogate extended configuration data, associated with the SIP domain, wherein an already existing list of the respective SIP domains own DNS domains, i.e. the DNS domains managed by the SIP domain, has been extended with a parameter, set for each DNS domain, indicating whether the respective DNS domain is shared with another SIP domain or not. The node is adapted to perform a query, typically a DNS query procedure, of the incoming request, when it is indicated in the configuration data that the DNS domain is a shared domain. The query procedure may involve one or more queries, which may be executed in a specific, predetermined manner, in order to enable the node to route the request accordingly. Alternatively, the query may be done over Diameter, the Lightweight Directory Access Protocol (LDAP) or any other protocol, suitable for executing this type of queries.

By implementing the suggested mechanism in a SIP domain, a request addressed to a shared DNS domain, thus, will be routed accordingly, in response to an interrogation of additional, informative configuration data, comprising data associated with DNS domains shared between different SIP domains.

A general network architecture adapted to handle a DNS domain name which is shared by more than one SIP domain, according to one embodiment will now be described in further detail with reference to FIG. 2. It is to be understood that nodes and signalling steps which are not necessary for the understanding of the suggested mechanism have been omitted for simplicity reasons. It should also be noted that the architecture depicted in FIG. 2 is purely logical and that the described units proving relevant functionality to the nodes can be implemented in different, alternative ways.

Figure 2:
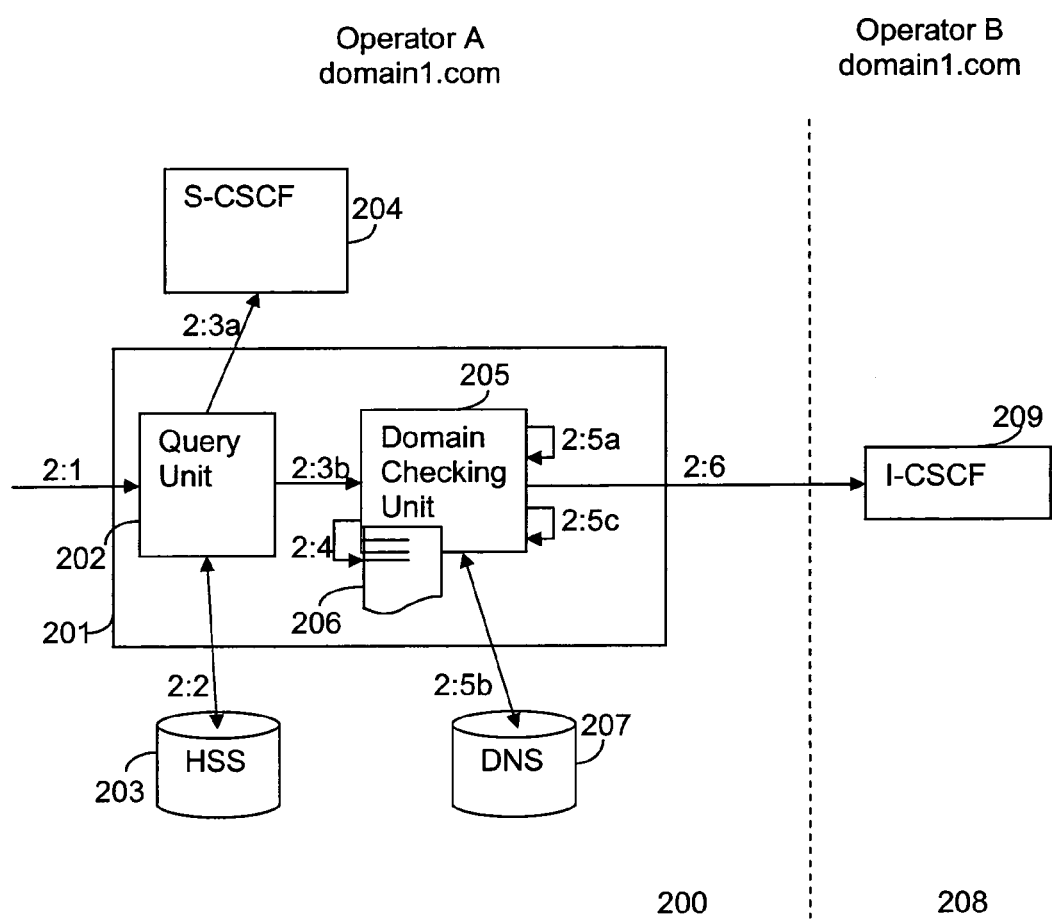
FIG. 2 is a basic overview of a procedure for handling a request addressed to a shared DNS domain, according to one embodiment.

FIG. 2 illustrates how a request is handled by a modified SIP node 201, in this case an I-CSCF, managed by operator A of IMS domain 200, and adapted to interrogate an incoming request according to a novel domain interrogating mechanism. The I-CSCF 201 comprises a query unit 202, adapted to perform a query of a user database 203, in this case a HSS, upon receiving an incoming request. The purpose of the HSS query is to find an appropriate serving node 204, in this case an S-CSCF, or any other type of corresponding node, which is responsible for delivering the request to the intended terminating entity (not shown). The terminating entity may be located in IMS domain 200, or in another domain, such as e.g. IMS domain 208, sharing the DNS domain.

Up to this point, the described procedure has been executed according to well known query and routing procedures. If a relevant S-CSCF 204 is found in the user database query, the request is routed to the respective S-CSCF, from where the request is routed further to the terminating entity, such as e.g. an application server (AS) (not shown), as per standard behaviour.

If, however, no match is found after having execute the query, a domain checking unit 205 is activated instead of rejecting the request, as would normally have been the next step to be executed in this particular situation. The domain checking unit 205 is adapted to determine whether the DNS domain of the incoming request is a shared DNS domain or not. This is achieved by interrogating configuration data 206, stored at, or in association with the interrogating node 201. The configuration data has been extended with at least one new post, hosting a parameter, indicating whether the respective DNS domain is a shared domain or not. The configuration data may also comprise an additional post, comprising local configuration information, indicating one or more globally routable URIs of one or more IMS domains with which a respective DNS domain is shared. Based on this configuration data, a request addressed to a shared DNS domain will be routed to the relevant IMS domain, while a request to a DNS domain which is not shared with another IMS domain will be rejected by the handling unit in a conventional manner if a user database query fails.

Based on the configuration data, the routing may be executed subsequent to a query, or, if local configuration information is accessible from the configuration data, subsequent to the routing to a shared IMS domain. A query, such as, e.g. a DNS query, typically involves interrogating one or more DNS servers, which may include an ENUM DNS or an enterprise specific DNS, if the request comprises a telephone number. In FIG. 2 this query is exemplified with a DNS query, executed at DNS server 207.

A request, arriving at IMS domain 200 of operator A in a first stage 2:1, is queried by the query unit 202 at a next stage 2:2, wherein HSS 203 is interrogated, according to well established procedures. If a match is found, i.e. if an S-CSCF, associated with the respective DNS domain name is found in the HSS, the request is routed to the respective S-CSCF 204, as illustrated with a stage 2:3a. If, however, no match is found in the HSS query, a domain checking procedure is instead initiated, as illustrated with an alternative stage 2:3b. The domain checking procedure, which is illustrated with a next stage 2:4, compares the host part, i.e. "domain1.com" of the DNS domain name of the request, against the configuration data 206, accessible by the domain checking unit 205. If it is found that the DNS domain name is shared between two or more IMS domains, the domain checking unit is adapted to resolve the DNS domain name into a globally routable URI, as indicated with a subsequent stage 2:5a.

Initially, a resolving procedure, adapted to interrogate the configuration data 206 is activated. The purpose of the resolving procedure is to determine whether any local configuration associated with the respective IMS domain exists or not, i.e. whether the configuration data 206 comprises a registration of one or more globally routable URIs, associated with an IMS domain with which the DNS domain is shared. If local configuration is found, the DNS domain name is resolved so that the request can be routed to a registered IMS domain 208, managed by operator B, as indicated with a stage 2:6. If more than one IMS domain is registered in the configuration data, one of the domains, e.g. the first one, may be selected as the next destination for the routing of the request. Typically, the configuration of the interrogating node 201 further comprises preconfigured rules, specifying how to select a domain to which the request is to be routed. If no match is found at the selected destination domain, the interrogating node of the destination domain may be configured to route the request further to the next registered IMS domain. This procedure typically continues until the appropriate IMS domain and terminating entity is found. Alternatively, the user information of the destination URI of the request may be analysed, and the result may be used for resolving the URI to the right IMS domain already in the first place.

Although only an I-CSCF 209, is shown in IMS domain 208 of operator B, it is to be understood that, as for any IMS domain, or any other type of SIP domain, domain 208 also comprises additional nodes, such as conventional control function nodes and servers, necessary for managing and providing IMS- and/or other SIP services to end-users.

At the IMS domain 208, a DNS query procedure and/or any other query procedure is executed, before the request can be forwarded (not shown) to the terminating destination at IMS domain 208, all according to conventional query and routing procedures.

If no local configuration can be found in the configuration data during the resolving phase at stage 2:5a, a querying procedure will be executed, according to any known technique. The query procedure may comprise one or more DNS queries and/or other queries, according to the configuration, specified for IMS domain 200. In this example, a query, executed at DNS server 207, is illustrated with an alternative stage 2:5b. Based on the result from the suggested DNS query procedure, the destination address of the request is resolved into a globally routable URI. Provided with a global URI, the request can now be routed to the terminating domain 208 at stage 2:6. At domain 208, additional routing may be executed in order to deliver the request to the intended terminating entity. If, however, the DNS domain is not a shared domain, the request is instead rejected as per standard behaviour. This is illustrated with the alternative stage 2:5c.

A simplified table 300, illustrating one example of extended configuration data according to the embodiment described above is presented in FIG. 3. The exemplified table comprises the three domains "domain1.com", "domain2.com" and "domain3.com", registered in a "domain" column 301. This category of configuration data, indicating all DNS domains of an IMS domain is already retrievable in prior art solutions, together with other configuration data for the IMS domain, such as information referring to e.g. authentication, service capabilities, and available HSS entities of the IMS domain. The configuration data presented in FIG. 3, however, also comprises a parameter indicating for each DNS domain whether the DNS domain is a shared domain (yes) or not (no) in a "shared" column 302. In addition, the table of FIG. 3 may also comprise an optional "shared with" column 303 where information, telling with which one or more IMS domains a respective DNS domain is shared may be registered. Consequently, a request aimed for the DNS domain "domain1.com" will be routed according to the routing information stored in the table, i.e. to the IMS domain "telenor.com", where a conventional DNS query procedure will be executed in order to route the request to the terminating destination, while a request aimed for "domain2.com" will be rejected by the interrogating node, since "domain2.com" is not registered as a shared domain. Finally, a request having the host part "domain3.com" will be routed according to the information retrieved from one or more queries.

According to another aspect, a method for handling a request which may be addressed to a shared DNS domain, will now be described, referring to the flow chart of FIG. 4. Starting at a first step 400, a request arrives at an interrogating SIP node of a SIP domain A, which typically is an IMS domain. At the interrogating SIP node of domain A, the DNS domain name is queried in a user database in a next step 401, wherein the query results in a failure to find a match, and, thus, in a failure for the operator to route the request without any further processing. Subsequent to such a determination, configuration data is interrogated for determining whether the DNS domain of the request is a shared domain or not. This is executed in a next step 402. If it is found that the DNS domain is not a shared domain, the request is rejected, according to known procedures, as illustrated with a step 403, before the procedure is terminated at step 406. If, however, the DNS domain is a shared domain, according to the configuration data, the DNS domain name of the request is resolved into a globally routable URI in a step 404, and the request is routed to a SIP domain, according to the URI, as indicated in a subsequent step 405, before the procedure of the SIP node is terminated at a step 406. At the SIP domain to which the request is routed, the request is delivered to the terminating entity according to known procedures.

Figure 4:
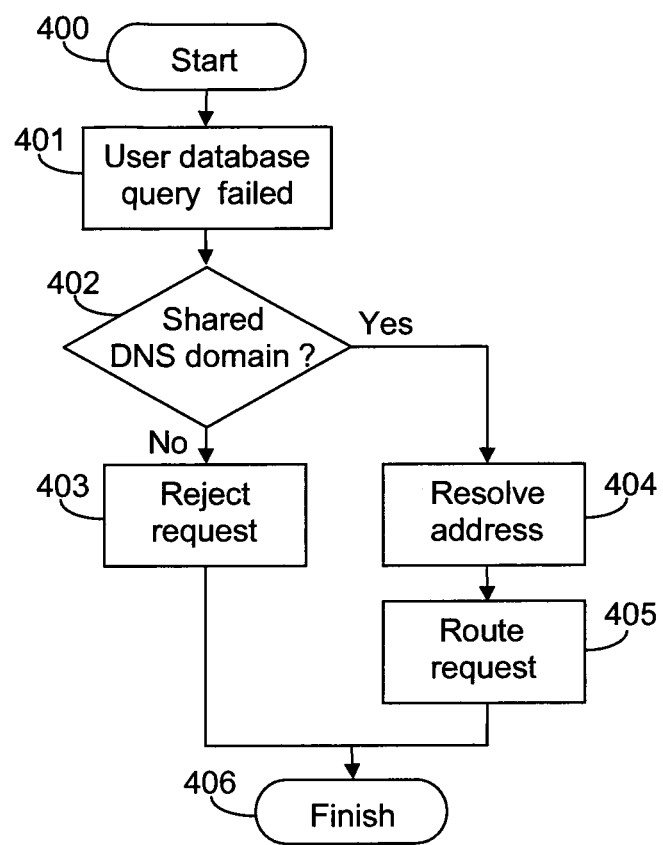
FIG. 4 is a flow chart illustrating a method for handling an incoming request in a SIP domain, according to one embodiment.

The resolving procedure, indicated with step 404 of FIG. 4 may be executed in different ways, depending on what information that can be retrieved from the configuration data.

Figure 5:
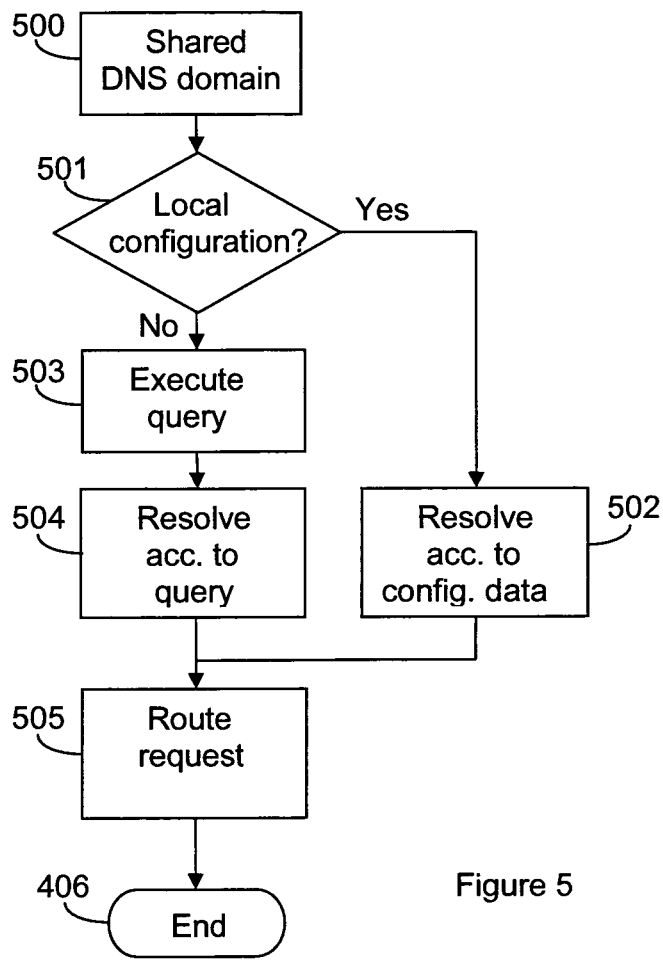
FIG. 5 is a flow chart illustrating alternative ways of resolving a shared IMS domain name in the method described with reference to FIG. 4.

In FIG. 5, steps 404 and 405 of FIG. 4 have been replaced with an alternative block scheme. If it has been found that a request comprises a shared DNS domain name, as illustrated with a step 500, i.e. step 402 of FIG. 4 has resulted in the "Yes" alternative, it is determined whether a local configuration, comprising information of a SIP domain B, with which the DNS domain is shared, is present in the configuration data. Such a determination is executed in a next step 501. If such information is indeed registered, the request is resolved into an appropriate address in a step 502 and the request is routed to the respective SIP domain B in a subsequent step 505. At SIP domain B, a query procedure, typically a DNS query procedure involving one or more DNS servers, will be executed in a known manner, and the request can be routed to the terminating entity accordingly. If, on the other hand, no such local configuration is found, a query procedure, e.g. a DNS query procedure, is instead executed at SIP domain A, querying the complete terminating URL of the request, as indicated with another alterative step 503. Using the result of the query procedure, the terminating URI is resolved into a globally routable URI in a subsequent step 504. Using the URI, the request is then routed accordingly at a next step 505, before the described resolving procedure is terminated, as indicated with step 406 of FIG. 4. At the terminating domain, the request will be routed so that it reaches the terminating entity, according to known procedures.

While the invention has been described with reference to specific exemplary embodiments, the description is generally only intended to illustrate the inventive concept and should not be taken as limiting the scope of the invention, which is defined by the appended claims.

The invention claimed is:

1. A method in a node of a SIP domain for handling an incoming request for a SIP service at the SIP domain for which a user database query has failed, the method comprising the following steps:
    determining if a DNS domain name of said request is registered as a shared domain, by checking configuration data, said configuration data comprising all DNS domains managed by an operator of said SIP domain,
    resolving said DNS domain name into a globally routable URI, and
    one of routing said request towards a terminating entity if said DNS domain name is registered as a shared domain, and
    rejecting said request if said DNS domain is not registered as a shared domain.

2. The method according to claim 1, wherein said determining step comprises checking configuration data.

3. The method according to claim 2, wherein said configuration data comprises an associated parameter indicating whether the respective DNS domain is a shared domain or not.

4. The method according to claim 3, wherein said configuration data further comprises a post for storing one or more URIs, each indicating a SIP domain with which a respective DNS domain is shared.

5. The method according to claim 4, wherein if said configuration data comprises one or more SIP domain names, this information is used when resolving said DNS domain name into a globally routable URI.

6. The method according to claim 2, wherein if no SIP domain name is registered in said configuration data as a shared DNS domain, the respective DNS domain name is resolved after having performed a query.

7. The method according to claim 1, wherein said node is a Call Session Control Function (CSCF).

8. The method according to claim 7, wherein said CSCF is an Interrogating CSCF (I-CSCF).

9. The method according to claim 1, wherein said SIP domain is an IMS domain.

10. The method according to claim 1, wherein said query is a DNS query.

11. A node of a SIP domain in a telecommunications network for handling an incoming request for a SIP service at the SIP domain for which a user database query has failed, the node comprising a microprocessor, a main memory coupled to the microprocessor and persistent storage, associated with the microprocessor, including instructions that, when executed by the microprocessor, cause the node to perform the following:
    initiating a domain checking procedure in response to said failed user database query, by checking configuration data, said configuration data comprising all DNS domains managed by an operator of said SIP domain, and
    said domain checking procedure comprising determining if the DNS domain of said request is registered as a shared domain or not,
    resolving said DNS domain name into a globally routable URI and routing said request towards the terminating entity if said DNS domain is registered as a shared domain, or rejecting said request if said DNS domain is not registered as a shared domain.

12. The node according to claim 11, wherein said domain checking procedure comprises checking configuration data stored at or in association with said node.

13. The node according to claim 12, wherein said configuration data comprises an associated parameter indicating whether the respective DNS domain is a shared domain or not.

14. The node according to claim 13, wherein said configuration data further comprises a post for storing one or more URIs, each indicating a SIP domain with which a respective DNS domain is shared.

15. The node according to claim 11, wherein said DNS domain name is resolved into a globally routable URI on the basis of said configuration data in case one or more SIP domains with which the respective DNS domain is shared are registered in said configuration data.

16. The node according to claim 11, wherein said DNS domain name is resolved after having performed a query if no SIP domain is registered in said configuration data.

17. The node according to claim 11, wherein said node is a Call Session Control Function (CSCF).

18. The node according to claim 17, wherein said CSCF is an Interrogating CSCF (I-CSCF).

19. The node according to claim 11, wherein said SIP domain is an IMS domain.

20. The node according to claim 11, wherein said query is a DNS query.

* * * * *

UNITED STATES PATENT AND TRADEMARK OFFICE
CERTIFICATE OF CORRECTION

PATENT NO. : 8,949,398 B2
APPLICATION NO. : 12/738458
DATED : February 3, 2015
INVENTOR(S) : Falkena It is certified that error appears in the above-identified patent and that said Letters Patent is hereby corrected as shown below:

On the title page, item (56), under "OTHER PUBLICATIONS", in Column 2, Line 4, delete "Orginizational" and insert -- Organizational --, therefor.

In the specification,

In Column 2, Line 20, delete "provide," and insert -- provide --, therefor.

In Column 4, Line 34, delete "I-CSCF 201" and insert -- I-CSCF 209 --, therefor.

Signed and Sealed this
Seventeenth Day of May, 2016

Michelle K. Lee
*Director of the United States Patent and Trademark Office*